Patented Jan. 16, 1951

2,538,199

UNITED STATES PATENT OFFICE 2,538,199

DUST FILTER ADHESIVE

George D. Jefferson, Kennett Square, Pa., and Earl K. Stigger, Wilmington, Del., assignors to Atlas Powder Company, Wilmington, Del., a corporation of Delaware No Drawing. Application May 10, 1949, Serial No. 92,496

11 Claims. (Cl. 252—88)

This invention relates to dust adhesive compositions suitable for impregnating or coating the porous filtering media of gas filters, and more particularly to smoke and flame resistant dust adhesive compositions suitable for said purpose.

In air conditioning, heating, and ventilation systems and the like, circulating air is often freed from air borne dust particles by conducting it through porous filtering media. Such media may comprise laminations of fine mesh wire screens, or loosely felted fibers of organic or inorganic nature, such, for example, as rock wool, animal hair, glass wool, steel wool, resinous fibers and the like. The dust removing efficiency of such filters is greatly enhanced by coating or impregnating the filtering media, by dipping, spraying, or other suitable means, with liquid compositions to which the air borne dust particles adhere. A great many liquids have been suggested and used as dust adhesive impregnants in gas filters. Heavy mineral oil is an efficient dust collector in such systems but the places in which filters impregnated therewith can be used are limited because of its inflammability. The risk of having a readily inflammable material in a duct under a forced draft of air in case fire should break out is at once obvoius. Even if the filter impregnant should not burn, it is highly desirable that it not decompose or volatilize to yield voluminous smoke when subjected to heat. Especially in places of public gathering such evolution of smoke from a locally overheated filter in the ventilating or heating system might readily cause a disastrous panic. The relatively non-inflammable tricresyl phosphate can be used only sparingly as an adhesive for dust in fibrous filters because it smokes copiously when heated even though it does not burn.

It is an object, therefore, of this invention to provide new dust adhesive compositions for gas filters.

It is a further object to provide dust adhesive compositions of improved smoke and flame resistance.

Other objects will become apparent in the course of the following description of the invention and the appended claims.

Compositions fulfilling the above objects in accordance with this invention comprise three component mixtures in which each component may be a single compound or a mixture of compounds. Component A is a low molecular weight, relatively volatile polyol selected from the group consisting of ethylene glycol, diethylene glycol, glycerol, and mixtures of any two or all three of these. Component B is a higher molecular weight, less volatile polyhydroxylic material, containing at least 5 carbon atoms and containing only the elements carbon, hydrogen, and oxygen, the ratio of carbon atoms to oxygen atoms being no greater than 2; said polyhydroxylic material being characterized by a high degree of water solubility and by the property of forming syrupy aqueous solutions. Mixtures of such polyhydroxylic materials are also contemplated as component B. The third component which is designated herein as component C is a member selected from the group consisting of boric acid, phosphoric acid, sulfamic acid, and mixtures of two or all three of said acids.

The viscosities of such compositions may be reduced if desired, for purposes of spraying on to fibrous filter media, by the addition of small amounts of water.

Alternatively, the dust adhesive compositions may contain minor proportions of modifying ingredients in addition to the three essential components above described. Thus, the acidity of the compositions may be neutralized to any desired extent provided the neutralizing base, which may be either organic or inorganic, is so selected and used in such amount that precipitation of solid matter from the liquid composition is not induced. Among suitable bases for the purpose are the alkali metal hydroxides, ammonia, urea, and the ethanol amines. In the preferred embodiment, the neutralizing agent is triethanol amine.

Similarly, the three component compositions of the present invention may, if desired, be modified by the incorporation of minor amounts of wetting agents. Improved dust catching efficiency, especially of difficulty wettable, hydrophobic dust particles, may sometimes be obtained by such incorporation. Surface active agents which have been found to be sufficiently compatible with the compositions of this invention for incorporation therewith include the polyoxyethylene ether of sorbitan mono tall oil ester containing an average of 30 oxyethylene groups per mol; the penta tall oil ester of the polyoxyethylene ether of sorbitol containing an average of 40 oxyethylene groups per mol, and the polyoxyethylene ether of alkyl phenol commercially available under the trade name Triton NE. It is preferred to use not over 5%, on the total composition, of such wetting agents.

Polyhydroxylic materials meeting the requirements of component B as above set forth, and suitable for use in the flame resistant dust adhesives of the present invention include sorbitol, glucose, invert sugar, sucrose, xylose, xylitol, diglycerol, polyglycerols, the higher polyglycols, mixed monoanhydro derivatives of the hexitols such as sorbitan, mannitan, and the like, polyoxyethylene ethers of any of the above polyols, and polyoxyethylene ethers of the hexitols, glycerol, and pentaerythritol. The said polyoxyethylene ethers should contain not more than about 40 oxyethylene groups per mol of parent polyhydroxylic material and not more than about 10 oxyethylene groups per hydroxyl group of said parent polyhydroxylic material. Within the large group of operative syrup forming polyhydroxylic materials so disclosed, it is preferred to use sorbitol of the non-oxyethylated group; and polyoxyethylene ethers of mixed sorbitans containing up to an average of about 12 oxyethylene groups per mol of sorbitan, or polyoxyethylene ethers of sorbitol containing up to an average of about 20 oxyethylene groups per mol of sorbitol, of the oxyethylated compounds.

The weight proportion of component A to component B in operable dust catching adhesive compositions according to this invention may be as high as 90 to 10 and as low as 10 to 90. When component B is a polyoxyethylene ether, the preferred compositions are in the lower end of the said range of proportions, i. e., the weight proportion of component A to component B lies between the limits of 10 to 90 and 50 to 50. Conversely, when component B is a polyol free from oxyethylene groups, such for example, as sorbitol, glucose, or the like, the weight proportion of component A to component B in the preferred modifications lies between the limits of 50 to 50 and 90 to 10.

In order that the compositions of the present invention may exhibit improved smoke and flame resistance, they should contain at least 5 parts by weight of component C to each 100 parts of combined components A and B, and the preferred compositions contain 10 to 40 parts thereof. Any greater proportion of the acid may be used without departing from the spirit of this invention, up to the limit of solubility of the acid in the mixed polyhydroxylic components. Since this limit of solubility varies with the choice of acid, the choice of polyhydroxylic materials, the choice of neutralizing agent and the extent of neutralization, it is not feasible to place a numerical upper limit on the amount of component C which may be employed. The numerous illustrative examples cited below will enable one skilled in the art to select suitable compositions for specific applications.

Preferred compositions according to the present invention are those in which component C is a mixture of phosphoric and boric acids containing at least 50% phosphoric acid by weight.

Compositions according to the present invention may be prepared by any suitable method. Simple mixing of all the components in a suitable vessel produces satisfactory compositions. When employing the solid acids, heat may be employed to hasten solution. Under such circumstances partial esterification between the acid and hydroxyl groups may take place, and compositions containing such partially esterified products are included within the scope of the invention.

Specific formulas illustrating compositions of the present invention are presented in the following examples. All indicated parts are by weight.

Example I

In a mixture of 12.4 parts of ethylene glycol and 37.2 parts of 95% aqueous glycerol dissolve 27.4 parts of dry sorbitol, warming to hasten solution. To the cooled mixture add with stirring 23.0 parts of 85% phosphoric acid. The resulting composition, adjusted to a solids content of 92 to 95%, is of suitable consistency for application to a glass fiber air filter by spraying, and is extremely flame resistant.

The addition of 21 parts of triethanol amine to 100 parts of the above composition neutralizes much of the free acidity and reduces the corrosiveness of the composition without destroying its dust catching efficiency or its flame resistance.

Example II 32.8 parts of sorbitol were dissolved in 48.4 parts of a 50–50 mixture of ethylene glycol and 95% glycerine. In the mixture of polyols so obtained, 12.2 parts of 85% phosphoric acid and 6.6 parts of boric acid were dissolved. The resulting solution was suitable for application to fibrous air filters by dipping and was extremely resistant to flame and to smoke evolution.

Example III

In a polyol mixture consisting of 17 parts of ethylene glycol, 8 parts of diethylene glycol and 75 parts of the polyoxyethylene ether of sorbitan containing an average of 6 oxyethylene groups per mol, there was dissolved 11.3 parts of 85% phosphoric acid and 2.8 parts of boric acid. The free acidity was partially neutralized with 5.4 parts of triethanol amine to yield a product of high flame and smoke resistance, and excellent dust catching efficiency.

Example IV

In a polyol mixture consisting of 17 parts of ethylene glycol, 8 parts of diethylene glycol and 75 parts of the polyoxyethylene ether of sorbitol containing an average of 20 oxyethylene groups per mol, dissolve 10 parts of 85% phosphoric acid and 4 parts boric acid. There is obtained a dust catching adhesive of sprayable viscosity which is highly noninflammable and resistant to smoke evolution.

Example V

A solution consisting of 65 parts of ethylene glycol, 35 parts of diethylene glycol, 100 parts of the polyoxyethylene ether of sorbitol containing an average of 7.5 oxyethylene groups per mol, and 36.7 parts (dry basis) of phosphoric acid was diluted to 90% solids and partially neutralized by the addition of 15.8 parts of 43% aqueous sodium hydroxide. The resulting solution was flame resistant and a suitable liquid for use as a dust catching adhesive.

Example VI

Dissolve 10 parts (dry basis) of phosphoric acid in a mixture of 30 parts ethylene glycol and 70 parts of the polyoxyethylene ether of pentaerythritol containing an average of 16 oxyethylene groups per mol to obtain a flame resistant dust catching adhesive.

In the commercial preparation of the polyoxyethylene ethers useful as component B in compositions of the present invention, the parent polyhydroxylic material is frequently employed in the form of a concentrated aqueous solution to facilitate handling. Part of the water present reacts with the added ethylene oxide to form polyglycols simultaneously with the principal oxyethylation reaction. For purposes of this invention the resulting mixtures of polyglycols and polyoxyethylene ethers of polyhydroxylic materials are the equivalent of the ethers obtained by the addition of ethylene oxide to the polyhydroxylic materials under anhydrous conditions.

Similarly, the crude reaction product of ethylene oxide with a large excess of water to produce mixtures of ethylene and diethylene glycol may economically be employed as component A in compositions of the present example. The following example teaches the use of such complex reaction mixtures as components A and B.

Example VII

*Component A.*—49 parts of ethylene oxide were introduced into an autoclave charged with 100 parts of water and caused to react at a temperature of 150° C. and 80 lbs. pressure until all of the ethylene oxide had been consumed. The resulting solution was concentrated by vacuum evaporation until its water content was between 4% and 5%. The nonaqueous portion of the concentrate comprised essentially 70% ethylene glycol, 25% diethylene glycol, and 5% of higher polyethylene glycols.

*Component B.*—483 parts of ethylene oxide were caused to react in an autoclave with 100 parts of an 85% aqueous solution of sorbitol. The resulting mixture, freed of volatiles by a vacuum deodorizing treatment, comprised a nonvolatile mixture of long chain polyethylene glycols and polyoxyethylene ethers of sorbitol.

20 parts (dry basis) of orthophosphoric acid and 2.5 parts of boric acid were dissolved in a mixture comprising 15 parts (dry basis) of the above described A component and 85 parts of B component. The acidity of the composition was partially neutralized by the addition of 9.6 parts of triethanol amine. The resulting solution was highly smoke and flame resistant and an excellent dust adhesive. Adjusted to a solids content of 90% by dilution with water it formed a solution of suitable viscosity for spraying on fibrous air filter mats.

On the other hand, it is sometimes convenient commercially to prepare mixtures which contain both A and B components of the present invention in a single step by oxyethylation of more dilute aqueous solutions of polyhydroxylic materials, than was employed in the preceding example. By way of illustration the oxyethylation of a 50% aqueous solution of sorbitol is described in the following example.

Example VIII 100 lbs. of a 50% solution of sorbitol in water was charged into an autoclave together with a catalyst comprising 328 grams of sodium acetate and 53 ml. of glacial acetic acid. 109 lbs. of ethylene oxide was pumped into the autoclave over a period of 3 hours while the charge was agitated at a temperature of 300° F., the pressure being maintained between 55 and 75 lbs. per square inch. After all of the ethylene oxide had been added the charge was maintained at temperature until the pressure fell to a constant value, indicating that substantially all of the ethylene oxide had reacted. The autoclave was discharged and the product treated under a vacuum at 50 mm. pressure for about an hour at a temperature of 70° C. to remove traces of unreacted ethylene oxide and volatiles. Analysis of the product showed it to contain about 5% water, about 50% of mixed oxyethylated sorbitol containing an average of 2.3 oxyethylene groups per mol and tri- or higher ethylene glycols, and about 45% of a mixture of mono- and diethylene glycols.

An excellent flame and smoke resistant dust catching adhesive has been prepared utilizing the product of Example VIII.

Example IX

| | Parts |
|---|---|
| Product of Example VIII | 28.4 |
| Polyoxyethylene ether or sorbitan containing an average of 6 oxyethylene groups per mol | 50.3 |
| Boric acid | 4.8 |
| Phosphoric acid | 3.1 |
| Triethanol amine | 1.8 |
| Polyoxyethylene ether or sorbitan mono-tall oil ester containing an average of 30 oxyethylene groups per mol | 3.0 |
| Water | 8.6 |

This example illustrates the use of a surface active agent in conjunction with the compositions of the present invention to further enhance their dust catching efficiency. It is included within the scope of the invention to utilize any such agents which are compatible with the compositions thereof.

The use of mixed sulfamic and phosphoric acids as the inorganic acid component is illustrated in the following:

Example X

A mixture of 17.7 parts sulfamic acid and 7.8 parts phosphoric acid was dissolved in a solution consisting of 48.8 parts of the polyoxyethylene ether of sorbitan containing 6 oxyethylene groups per mol and 25.7 parts of the product of Example VIII above. The resulting mixture when diluted to between 85% and 90% solids with water is of suitable consistency for spraying on fibrous air filter packs and is an excellent, flame resistant dust adhesive.

A non-acidic flame resistant dust adhesive may be prepared according to the following:

Example XI

Dissolve 23.7 parts of boric acid in 200 parts of a mixture consisting of 65 parts ethylene glycol, 35 parts diethylene glycol and 100 parts of the polyoxyethylene ether of sorbitan containing an average of 6 oxyethylene groups per mol. Neutralize the solution thus formed with 17.5 parts of triethanol amine. The pH of a 50% solution of the resulting mixture is 7.3 and the composition is sufficiently fluid that it may be sprayed on porous filters at concentrations as high as 95% solids.

The above cited examples are illustrative only and the invention is not limited to the specific formulas therein. What is claimed is:

1. A liquid dust catching adhesive composition consisting essentially of a mixture of (A) a member of the group consisting of ethylene glycol, glycerol and diethylene glycol; (B) an aliphatic, highly water-soluble, polyhydroxylic compound composed wholly of carbon, hydrogen and oxygen, containing at least 5 carbon atoms and not more than 2 carbon atoms for each oxygen atom, said compound being selected from the group consisting of sugars, polyhydric alcohols and polyoxyethylene ethers of sugars and polyhydric alcohols, said ethers containing not more than 40 oxyethylene groups per mol and not more than 10 oxyethylene groups per hydroxyl group; and (C) an acid selected from the group consisting of boric, phosphoric and sulfamic acids; the weight proportion of said component A to said component B being not greater than 90 to 10 and not smaller than 10 to 90, and the composition containing a minimum of 5 parts by weight of component C for every 100 parts by weight of the sum of components A and B.

2. A composition as in claim 1 wherein the acidity is partially neutralized with a water-soluble base.

3. A liquid dust catching adhesive composition consisting essentially of a mixture of (A) a member of the group consisting of ethylene glycol, glycerol and diethylene glycol, (B) a polyoxyethylene ether of a hexitol wherein the average number of oxyethylene groups per mol is no greater than 40, and (C) an acid selected from the group consisting of boric acid, phosphoric acid and sulfamic acid; the weight proportion of said A component to said B component being not greater than 50 to 50 and not smaller than 10 to 90, and the composition containing a minimum of 5 parts by weight of component C for each 100 parts by weight of the sum of components A and B.

4. A liquid dust catching composition as in claim 3, wherein component A is 15 parts of a mixture of substantially 70% ethylene glycol and 30% diethylene glycol, component B is 85 parts of the polyoxyethylene ether of sorbitol containing an average of 20 oxyethylene groups per mol, and component C is 22.5 parts of a mixed acid consisting of 20 parts phosphoric acid and 2.5 parts boric acid.

5. A liquid dust catching adhesive consisting essentially of the product of claim 4 partially neutralized by the addition of 9.6 parts of triethanol amine to 122.5 parts of said product.

6. A liquid dust catching adhesive composition consisting essentially of a mixture of (A) a member selected from the group consisting of ethylene glycol, glycerol and diethylene glycol, (B) sorbitol, and (C) an acid selected from the group consisting of boric acid, phosphoric acid and sulfamic acid; the weight proportion of said component A to sorbitol being not greater than 90 to 10 and not smaller than 50 to 50, and the composition containing a minimum of 5 parts by weight of component C for each 100 parts by weight of the sum of components A and B.

7. A liquid dust catching adhesive composition as in claim 6 wherein component A is a 25% solution of ethylene glycol in 95% aqueous glycerol, and component C is phosphoric acid.

8. A liquid dust catching adhesive composition consisting essentially of a mixture of (A) a member selected from the group consisting of ethylene glycol, glycerol and diethylene glycol, (B) a polyoxyethylene ether of a hexitan wherein the average number of oxyethylene groups per mol is no greater than 40, and (C) an acid selected from the group consisting of boric acid, phosphoric acid and sulfamic acid; the weight proportion of said component A to component B being not greater than 50 to 50 and not smaller than 10 to 90, and the composition containing a minimum of 5 parts by weight of component C for each 100 parts by weight of the sum of components A and B.

9. A liquid dust catching adhesive composition as in claim 8 wherein component A is 25 parts of a 2 to 1 mixture of ethylene and diethylene glycols, component B is 75 parts the polyoxyethylene ether of sorbitan containing an average of 6 oxyethylene groups per mol, and component C is 14 parts of a mixture of 85% phosphoric acid and boric acid in the proportion of 11.3 to 2.8.

10. A liquid dust catching adhesive composition consisting essentially of the product of claim 9 partially neutralized by the addition of 5.4 parts of triethanol amine to 114 parts of said product.

11. A liquid dust catching adhesive composition consisting essentially of a mixture of (A) a member selected from the group consisting of ethylene glycol, glycerol and diethylene glycol, (B) a mixture of polyoxyethylene ethers of sorbitol and of sorbitan wherein the average number of oxyethylene groups per mol is no greater than 40, and (C) an acid selected from the group consisting of boric acid, phosphoric acid, and sulfamic acid; wherein the weight proportion of component A to component B is not greater than 50 to 50 and is not smaller than 10 to 90, and wherein the composition containing a minimum of 5 parts by weight of component C for every 100 parts by weight of the sum of components A and B.

GEORGE D. JEFFERSON.
EARL K. STIGGER.

REFERENCES CITED

The following references are of record in the file of this patent:

UNITED STATES PATENTS

| Number | Name | Date |
|---|---|---|
| 2,353,937 | Smith | July 18, 1944 |
| 2,443,766 | Hedberg | June 22, 1948 |

FOREIGN PATENTS

| Number | Country | Date |
|---|---|---|
| 554,158 | Great Britain | June 23, 1943 |